(12) United States Patent
Tsao et al.

(10) Patent No.: US 7,784,980 B2
(45) Date of Patent: Aug. 31, 2010

(54) OUTDOOR LIGHTING APPARATUS

(75) Inventors: Chih-Chung Tsao, Miao-Li Hsien (TW); Wen-Jang Jiang, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 230 days.

(21) Appl. No.: 12/102,610

(22) Filed: Apr. 14, 2008

(65) Prior Publication Data
US 2009/0021943 A1    Jan. 22, 2009

(30) Foreign Application Priority Data
Jul. 19, 2007    (CN) .................... 2007 1 0201135

(51) Int. Cl.
*F21S 13/10*    (2006.01)
*A01M 29/00*    (2006.01)

(52) U.S. Cl. ................ 362/431; 362/276; 362/802; 116/22 A; 340/384.1

(58) Field of Classification Search ............... 362/276, 362/802, 431; 116/22 A; 340/384.1, 385.1
See application file for complete search history.

(56) References Cited

U.S. PATENT DOCUMENTS

| 5,627,518 A | * | 5/1997 | Wishart ................. 340/567 |
| 5,845,984 A | * | 12/1998 | Bonilla ................. 362/101 |
| 6,016,100 A | * | 1/2000 | Boyd et al. ............. 340/384.2 |
| 6,575,597 B1 | * | 6/2003 | Cramer et al. .......... 362/259 |

* cited by examiner

*Primary Examiner*—Ali Alavi
(74) *Attorney, Agent, or Firm*—Andrew C. Cheng

(57) ABSTRACT

An exemplary outdoor lighting apparatus includes a lighting device and a bird expeller. The lighting device includes a supporting pole, a housing and a light emitting unit. The housing is fixed on the top of the supporting pole. The light emitting unit is received in the housing. The bird expeller includes a sensing unit and an expelling signal generating unit. The sensing unit is configured for sensing a bird that is getting close by or in contact with the lighting device, generating a trigger signal and sending the trigger signal to the expelling signal generating unit. The expelling signal generating unit is configured for generating an expelling signal to expel the bird in response to the trigger signal.

8 Claims, 1 Drawing Sheet

OUTDOOR LIGHTING APPARATUS

BACKGROUND

1. Technical Field

The present invention generally relates to outdoor lighting apparatuses and, particularly, to an outdoor lighting apparatus with long lifespan.

2. Discussion of Related Art

Nowadays, light emitting diodes (LEDs) have been used extensively in lighting apparatus for outdoor illuminations due to high brightness, low power consumption and long lifespan. Since the LEDs has a high heat resistance, a heat dissipating module is usually required for dissipating the heat generated by the LEDs, so as to reduce the temperature of the LEDs. The heat dissipating module and the LEDs are indispensable to each other.

However, circuit wires for supplying electrical power and the heat dissipating module of the outdoor lighting apparatus are usually exposed to the outside, therefore, are prone to be damaged by birds that are close by or in contact with the outdoor lighting apparatus.

Therefore, what is needed is an outdoor lighting apparatus that can prevent itself from being destroyed by the birds.

SUMMARY

An outdoor lighting apparatus, in accordance with a present embodiment, is provided. The outdoor lighting apparatus includes a lighting device and a bird expeller. The lighting device includes a supporting pole, a housing and a light emitting unit. The housing is fixed on the top of the supporting pole. The light emitting unit is received in the housing. The bird expeller includes a sensing unit and an expelling signal generating unit. The sensing unit is configured for sensing a bird in vicinity of the housing, generating and sending a trigger signal to the expelling signal generating unit. The expelling signal generating unit is configured for emitting an expelling signal to expel the bird in response to the trigger signal.

Detailed features of the present outdoor lighting apparatus will become more apparent from the following detailed description and claims, and the accompanying drawings.

BRIEF DESCRIPTION OF THE DRAWINGS

Many aspects of the present outdoor lighting apparatus can be better understood with reference to the following drawing. The components in the drawing are not necessarily drawn to scale, the emphasis instead being placed upon clearly illustrating the principles of the present outdoor lighting apparatus.

The drawing is a schematic view of an outdoor lighting apparatus, in accordance with a present embodiment.

DETAILED DESCRIPTION OF THE PREFERRED EMBODIMENTS

Figure 1:
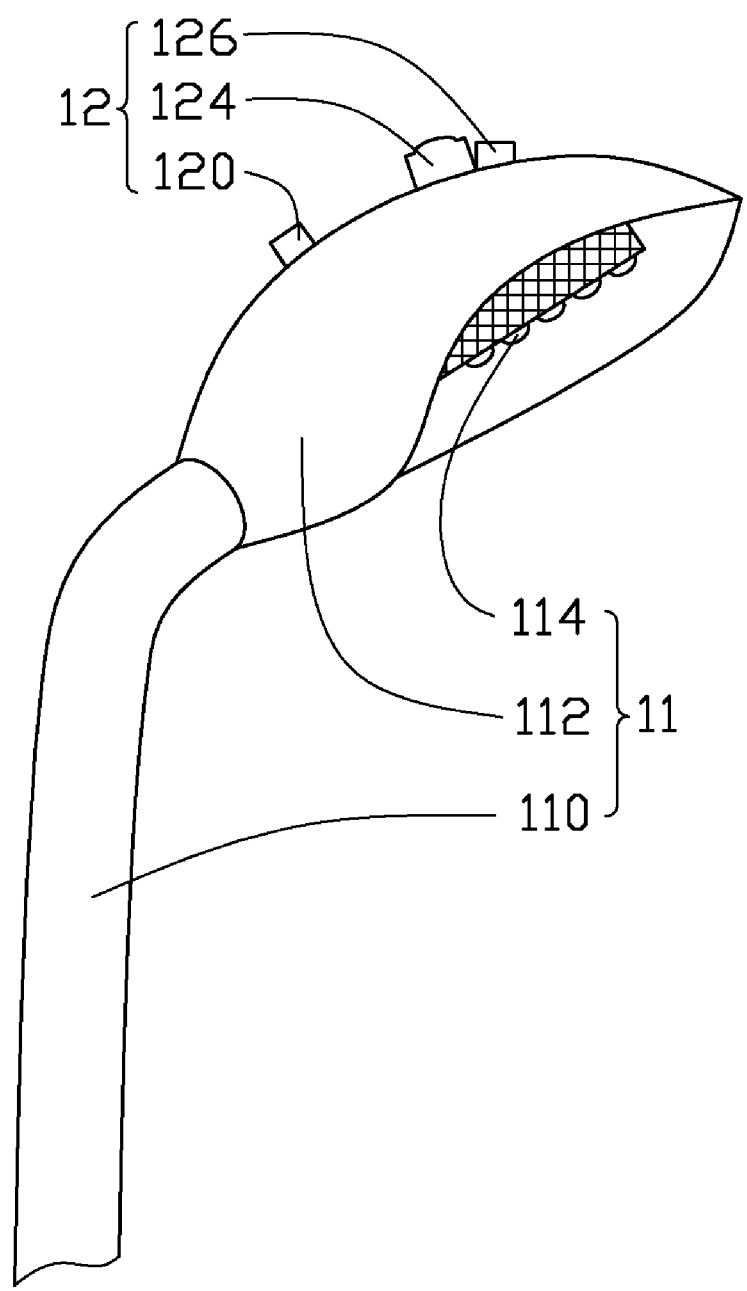

Reference will now be made to the drawing to describe the embodiments of the present outdoor lighting apparatus, in detail.

Referring now particularly to FIG. 1, an outdoor lighting apparatus 10, according to an exemplary embodiment, is provided. The outdoor lighting apparatus 10 includes lighting device 11 and a bird expeller 12.

The lighting device 11 includes a supporting pole 110, a housing 112 and a light emitting unit 114. The housing 112 is fixed on the top of the supporting pole 110. The light emitting unit 114 is received in the housing 112. The light emitting unit 114 can be a high voltage sodium lamp or a light emitting diode lamp module. In the present embodiment, the light emitting unit 114 is a light emitting diode lamp module.

The bird expeller 12 includes a sensing unit 120 and an expelling signal generating unit 124. The sensing unit 120 is disposed on an outer surface of the housing 112. The sensing unit 120 can be an infrared motion sensor, an infrared breaker, a shock sensor, a pressure sensor or a combination thereof. The sensing unit 120 is configured for sensing a bird in vicinity of the housing 112, generating and sending a trigger signal to the expelling signal generating unit 124.

The expelling signal generating unit 124 is disposed on the housing 112 and configured for emitting an expelling signal to expel the bird in response to the trigger signal. The expelling signal generating unit 124 can be a light emitting device that can emitting red light that have the stimulative effect to the bird, for example helium-neon(He—Ne) laser, an aluminum-gallium-indium-phosphorus (AlGaInP) laser, or a highlight aluminum-gallium-indium-phosphorus (AlGaInP) light emitting diode, thereby the bird getting close by or in contact with the lighting device 11 is expelled due to the stimulation of the red light. Alternatively, the expelling signal generating unit 124 can also be a sound generating device, for example a loudhailer that can generate a sound signal such as accipiter call, ultrasonic, sounds of a firearm, or intense yawp, thereby the bird that is close by or in contact with the lighting device 11 is expelled by the sound signal. It is to be indicated that the expelling signal generating unit 124 can also be a combination of the light emitting device and the sound generating device, thereby increase the stimulative effect on the bird that is close by or in contact with the lighting device 11.

It is to be said that, the expelling signal generated by the expelling signal generating unit 124 covers a certain range of space, thereby expelling the bird getting close by or in the space so as to prevent the bird from damaging the lighting device 11. As such, the expelling signal generating unit 124 can also be disposed on the supporting pole 110, nearby trees or buildings, and not limited to be disposed on the housing 13.

Preferably, the bird expeller 12 further includes a receiving unit 126 configured for communicating with the expelling signal generating unit 124. The receiving unit 126 can be an infrared receiving device, a micro wave receiving device or a blue tooth receiving device. An operator can change characteristics of the signal by programming the receiving unit 126, for example frequency and/or intensity of the signal generated by the expelling signal generating unit 124. As such, adaptability of the bird to a humdrum signal is avoided.

In sum, due to the outdoor lighting apparatus 10 being equipped with the bird expeller 12, which can prevent bird from getting close by or in contact with the lighting device 11, the outdoor lighting apparatus 10 can effectively works without being destroyed by the bird and thus has a longer lifespan.

Finally, it is to be understood that the above-described embodiments are intended to illustrate rather than limit the invention. Variations may be made to the embodiments without departing from the spirit of the invention as claimed. The above-described embodiment illustrates the scope of the invention but do not restrict the scope of the invention.

What is claimed is:

1. An outdoor lighting apparatus, comprising:
   a lighting device having a supporting pole, a housing fixed on the top of the supporting pole, and a light emitting unit received in the housing; and
   a bird expeller having a sensing unit and an expelling signal generating unit, wherein the sensing unit is configured for sensing a bird in vicinity of the housing, generating and sending a trigger signal to the expelling signal generating unit, the expelling signal generating unit is configured for emitting an expelling signal to expel the bird in response to the trigger signal, the sensing unit is selected from one of a shock sensor and a pressure sensor, and the expelling signal generating unit is a sound generating device.

2. The outdoor lighting apparatus according to claim 1, wherein the sensing unit is arranged on the supporting pole or the housing.

3. The outdoor lighting apparatus according to claim 1, wherein the expelling signal generating unit is arranged on the supporting pole or the housing.

4. The outdoor lighting apparatus according to claim 1, wherein the light emitting device is a helium-neon laser, an aluminum-gallium-indium-phosphorus laser, or a highlight aluminum-gallium-indium-phosphorus light emitting diode.

5. The outdoor lighting apparatus according to claim 4, wherein the receiving unit is an infrared receiving device, a micro wave receiving device or a blue tooth receiving device.

6. The outdoor lighting apparatus according to claim 1, wherein the sound generating device is a loudhailer.

7. The outdoor lighting apparatus according to claim 1, further comprising a receiving unit configured for communicating with the expelling signal generating unit and changing frequencies and/or intensities of the expelling signal.

8. An outdoor lighting apparatus, comprising:
a lighting device for achieving an illumination purpose, having a supporting pole, a housing fixed on the top of the supporting pole, and a light emitting unit received in the housing for generating light beams for illumination;
a bird expeller having a sensing unit and an expelling signal generating unit, wherein the sensing unit is configured for sensing a bird in vicinity of the housing, generating and sending a trigger signal to the expelling signal generating unit, the expelling signal generating unit is configured for emitting an expelling signal to expel the bird in response to the trigger signal.

* * * * *